United States Patent
Zhang

(10) Patent No.: US 11,860,417 B2
(45) Date of Patent: Jan. 2, 2024

(54) PRECISION SPACING CONTROL FOR OPTICAL WAVEGUIDES

(71) Applicant: Cisco Technology, Inc., San Jose, CA (US)

(72) Inventor: Xunyuan Zhang, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 30 days.

(21) Appl. No.: 16/565,203

(22) Filed: Sep. 9, 2019

(65) Prior Publication Data

US 2021/0072460 A1     Mar. 11, 2021

(51) Int. Cl.
*G02B 6/136* (2006.01)
*G02B 6/12* (2006.01)

(52) U.S. Cl.
CPC .... *G02B 6/136* (2013.01); *G02B 2006/12061* (2013.01); *G02B 2006/12097* (2013.01); *G02B 2006/12142* (2013.01)

(58) Field of Classification Search
None
See application file for complete search history.

(56) References Cited

U.S. PATENT DOCUMENTS

| | | | |
|---|---|---|---|
| 5,655,038 A * | 8/1997 | Schilling | G02B 6/131 385/16 |
| 6,803,318 B1 * | 10/2004 | Qiao | H01L 21/31116 257/E21.507 |
| 6,845,198 B2 | 1/2005 | Montgomery et al. | |
| 7,672,558 B2 * | 3/2010 | Keyser | G02B 6/122 385/129 |
| 8,363,986 B2 | 1/2013 | Webster et al. | |
| 9,310,629 B2 | 4/2016 | Patel et al. | |
| 9,360,688 B2 | 6/2016 | Patel et al. | |
| 9,766,484 B2 | 9/2017 | Adams et al. | |
| 2004/0208454 A1 * | 10/2004 | Montgomery | G02F 1/2257 385/40 |
| 2005/0260863 A1 * | 11/2005 | Nam | H01L 21/823468 257/E21.507 |

(Continued)

FOREIGN PATENT DOCUMENTS

CN         106133585 A  *  11/2016  ............. G02B 6/132

*Primary Examiner* — Chris H Chu
(74) *Attorney, Agent, or Firm* — Patterson + Sheridan, LLP

(57) ABSTRACT

Aspects described herein include a method of fabricating an optical apparatus. The method comprises etching a plurality of trenches partly through a first optical waveguide formed in a first semiconductor layer, wherein a first ridge is formed in the first optical waveguide between adjacent trenches of the plurality of trenches. The method further comprises conformally depositing a spacer layer above the first optical waveguide, wherein spacers are formed on sidewalls of each trench of the plurality of trenches. The method further comprises etching through the spacer layer to expose a respective bottom of each trench, wherein, for each respective bottom, a width of the respective bottom is defined by the spacers formed on the sidewalls of the trench corresponding to the respective bottom. The method further comprises depositing a first dielectric layer above the first optical waveguide, wherein dielectric material extends to the respective bottom of each trench.

13 Claims, 8 Drawing Sheets

(56) References Cited

U.S. PATENT DOCUMENTS

| | | | |
|---|---|---|---|
| 2006/0138433 A1* | 6/2006 | Joyner | H01S 5/227 385/129 |
| 2010/0019330 A1* | 1/2010 | Cannon | H01L 29/7848 257/402 |
| 2010/0244128 A1* | 9/2010 | Bulucea | H01L 29/1083 257/E21.409 |
| 2012/0219250 A1* | 8/2012 | Ren | G02B 6/136 385/14 |
| 2013/0056623 A1* | 3/2013 | Lipson | G02F 1/025 250/227.11 |
| 2016/0018677 A1* | 1/2016 | Ellis-Monaghan | H01L 29/0865 385/3 |
| 2016/0299363 A1* | 10/2016 | Wei | H01L 21/3215 |
| 2018/0046057 A1* | 2/2018 | Yu | G02F 1/2257 |
| 2020/0133091 A1* | 4/2020 | Oh | G02F 1/2257 |

\* cited by examiner

PRECISION SPACING CONTROL FOR OPTICAL WAVEGUIDES

TECHNICAL FIELD

Embodiments presented in this disclosure generally relate to optical modulation, and more specifically, to semiconductor-based electro-optic modulators.

BACKGROUND

Many electro-optic devices exploit the free carrier dispersion effect to change both the real and imaginary parts of the refractive index. This exploitation is used since the unstrained pure crystalline silicon does not exhibit a linear electro-optic (Pockels) effect, and the refractive index changes due to the Franz-Keldysh effect and Kerr effect are very weak. Phase modulation in a specific region of optical devices, such as Mach-Zehnder modulators, total-internal-reflection (TIR)-based structures, cross switches, Y-switches, ring resonators and Fabry-Perot resonators, may be used to modulate the output intensity.

Free carrier concentration in electro-optic devices can be varied by injection, accumulation, depletion, or inversion of carriers. Most of such devices investigated to date present some common features: they require long interaction lengths (for example, 5-10 mm) and injection current densities higher than 1 kA/cm$^3$ in order to obtain a significant modulation depth.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
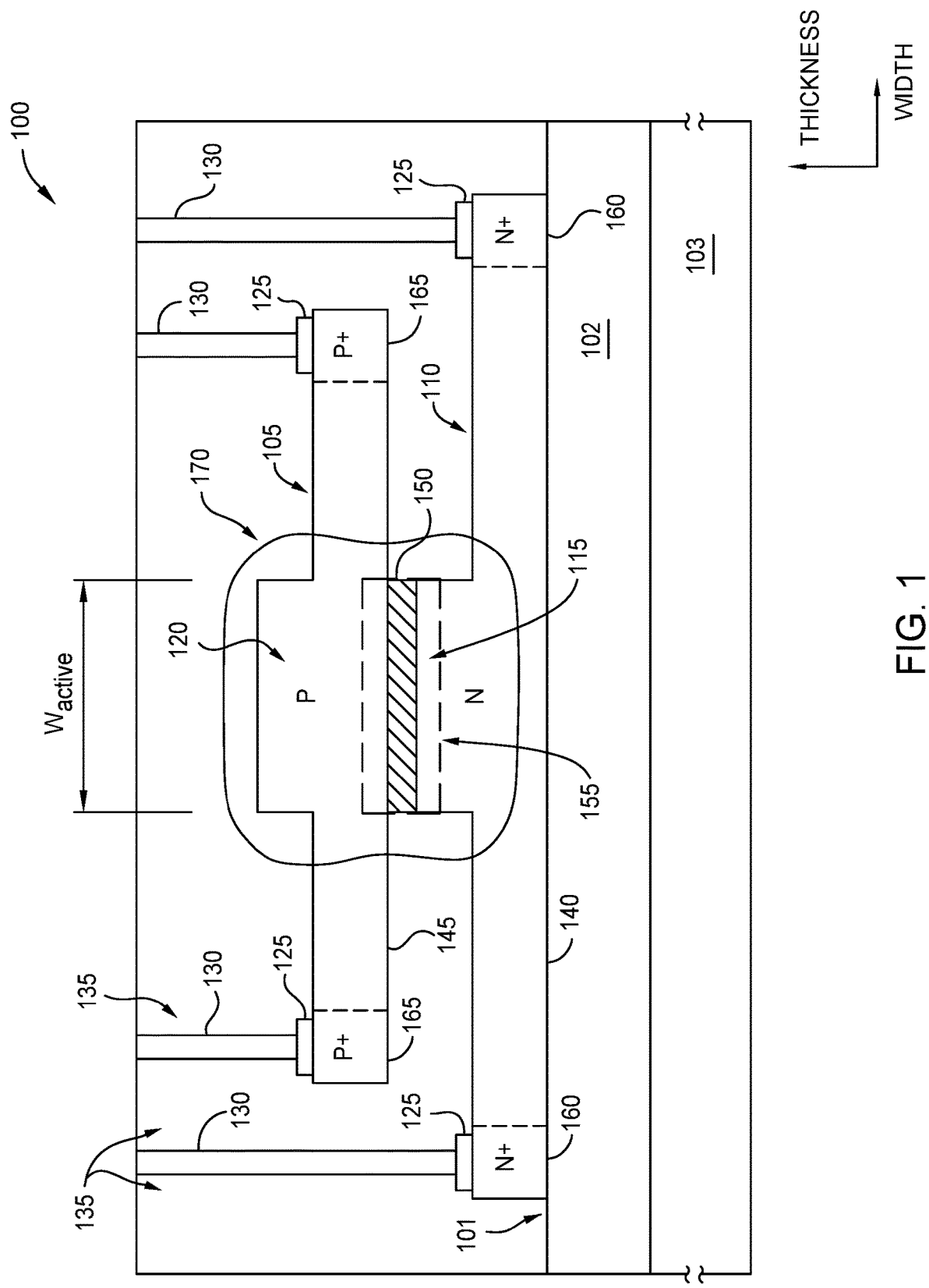
FIG. 1 is a cross-sectional view of an exemplary optical apparatus having optical waveguides with overlapping ridges, according to one or more embodiments.

One embodiment presented in this disclosure is a method of fabricating an optical apparatus. The method comprises etching a plurality of trenches partly through a first optical waveguide formed in a first semiconductor layer. A first ridge is formed in the first optical waveguide between adjacent trenches of the plurality of trenches. The method further comprises conformally depositing a spacer layer above the first optical waveguide. Spacers are formed on sidewalls of each trench of the plurality of trenches. The method further comprises etching through the spacer layer to expose a respective bottom of each trench. For each respective bottom, a width of the respective bottom is defined by the spacers formed on the sidewalls of the trench corresponding to the respective bottom. The method further comprises depositing a first dielectric layer above the first optical waveguide. Dielectric material extends to the respective bottom of each trench.

Another embodiment presented in this disclosure is an optical apparatus comprising a first optical waveguide formed in a first semiconductor layer. The first optical waveguide extends in a direction of an optical path. The optical apparatus further comprises a second optical waveguide formed in a second semiconductor layer and separated from the first optical waveguide by a dielectric layer. The first optical waveguide and the second optical waveguide are at least partly overlapping along the direction. At least the first optical waveguide has a first ridge extending along the direction, the first ridge defined between spacers having a predetermined width.

Another embodiment presented in this disclosure is a method of fabricating a silicon-insulator-silicon capacitive (SISCAP) apparatus. The method comprises etching a plurality of first trenches partly through a first optical waveguide formed in a first silicon layer. A first ridge is formed in the first optical waveguide between adjacent first trenches. The method further comprises conformally depositing a first spacer layer above the first optical waveguide. Spacers are formed on sidewalls of each first trench. The method further comprises etching through the first spacer layer to expose a respective bottom of each first trench. For each respective bottom, a width of the respective bottom is defined by the spacers formed on the sidewalls of the first trench corresponding to the respective bottom. The method further comprises depositing a first dielectric layer above the first optical waveguide. Dielectric material extends to the respective bottom of each first trench. The method further comprises depositing a second silicon layer above the first dielectric layer, and etching a plurality of second trenches partly through a second optical waveguide formed in the second silicon layer. A second ridge is formed in the second optical waveguide between adjacent second trenches. The method further comprises conformally depositing a second spacer layer above the second optical waveguide. Spacers are formed on sidewalls of each second trench. The method further comprises etching through the second spacer layer to expose a respective bottom of each second trench. For each respective bottom of each second trench, a width of the respective bottom is defined by the spacers formed on the sidewalls of the second trench corresponding to the respective bottom. The method further comprises depositing a second dielectric layer above the first optical waveguide. Dielectric material extends to the respective bottom of each second trench.

Example Embodiments

Long interaction lengths may be undesirable in order to achieve high levels of integration and miniaturization for fabricating low-cost, compact device arrangements. Further, high current densities may induce unwanted thermo-optic effects as a result of heating the structure, which will cause an opposite effect on the real refractive index change relative to that associated with free carrier movement, thus reducing its effectiveness.

In an optical apparatus, such as an optical modulator, different regions of an optical waveguide may have different doping levels (or concentrations) to provide desired operational characteristics of the optical waveguide. For example, a lower doping level may be used in some regions to shape an optical mode by controlling an optical loss of the optical waveguide, and a higher doping level may be used in other regions to reduce an overall electrical resistance of the optical waveguide.

Defining the differently-doped regions using standard lithography techniques may introduce errors due to critical dimension variation and/or overlay errors. In some embodiments, fabricating an optical apparatus comprises conformally depositing a spacer layer above an optical waveguide, such that spacers of a predetermined width are formed on sidewalls of trenches formed partly through the optical waveguide. The spacers are self-aligned to the sidewalls of the trenches, and the spacer width may be well-controlled, e.g., through controlling a deposition thickness of the spacer layer. Beneficially, errors due to critical dimension variation and/or overlay errors may be mitigated, which allows the resistance across the optical waveguide and/or the optical loss along the optical path to be more precisely controlled.

FIG. 1 is a cross-sectional view of an exemplary optical apparatus 100 having optical waveguides with overlapping ridges, according to one or more embodiments. In some embodiments, the optical apparatus 100 comprises a silicon-on-insulator (SOI) based electro-optic modulator. The optical apparatus 100 comprises a semiconductor layer 101, an insulator layer 102 (which may also be referred to as a dielectric layer), and a semiconductor substrate 103. For example, the optical apparatus 100 may be formed using a SOI substrate, such that the semiconductor layer 101 and the semiconductor substrate 103 are formed of monocrystalline silicon, and the insulator layer 102 comprises a buried oxide (BOX) layer. Other elemental semiconductor materials and compound semiconductor materials are also contemplated for the semiconductor layer 101 and/or the semiconductor substrate 103. Moreover, the semiconductor layer 101 and the semiconductor substrate 103 may be made from the same material, but in other embodiments may be made from different materials.

A thickness of the semiconductor layer 101 may range from less than 100 nanometers to greater than a micron. In some embodiments, the thickness of the semiconductor layer 101 is between 100 and 300 nanometers. The thickness of the insulator layer 102 may vary depending on the desired application. For example, the thickness of the insulator layer 102 may directly depend on the size of the optical mode being coupled to the optical apparatus 100 and the desired efficiency. As such, the thickness of the insulator layer 102 may range from less than one micron to tens of microns. The thickness of the semiconductor substrate 103 may also vary depending on the desired application of the optical apparatus 100. For example, the semiconductor substrate 103 may be the thickness of a typical semiconductor wafer (e.g., between 100 and 700 microns) or may be thinned and mounted on another substrate.

For optical applications, the semiconductor layer 101 and the insulator layer 102 (e.g., silicon oxide, silicon nitride, and the like) may provide contrasting refractive indexes that vertically confine an optical signal in a waveguide formed in the semiconductor layer 101. In a later processing step, the semiconductor layer 101 of the optical apparatus 100 may be etched to form one or more silicon waveguides. Because silicon has a high refractive index compared to an insulator material such as silicon oxide, the optical signal remains primarily in the waveguide as it propagates across the semiconductor layer 101.

As shown, the optical apparatus 100 includes an upper waveguide 105 doped with a first conductivity type (e.g., P-type). The upper waveguide 105 is spaced apart from a lower waveguide 110 doped with a second, different conductivity type (e.g., N-type) by a gate dielectric layer 150. As shown, the upper waveguide 105 is doped P-type while the lower waveguide 110 is doped N-type. However, for all the embodiments where the dopant type is specified, the dopant types may be reversed—e.g., the upper waveguide 105 may be doped N-type while the lower waveguide 110 is P-type.

In some embodiments, the lower waveguide 110 is formed in a semiconductor layer 101 (e.g., of a SOI substrate), and the upper waveguide 105 is formed in a semiconductor layer that is arranged above the semiconductor layer 101. In one example, after forming the lower waveguide 110, a dielectric layer (e.g., an oxide layer) is deposited above the lower waveguide 110, and the semiconductor layer for the upper waveguide is deposited above the dielectric layer.

The lower waveguide 110 and the upper waveguide 105 may be formed of any suitable elemental and/or compound semiconductor materials. Moreover, the lower waveguide 110 and the upper waveguide 105 may be formed from the same material, but in other embodiments may be made from different materials. In one example, the lower waveguide 110 is formed of monocrystalline silicon, and the upper waveguide 105 is formed of polycrystalline silicon.

The arrangement of the upper waveguide 105, the gate dielectric layer 150, and the lower waveguide 110 forms a silicon-insulator-silicon capacitor (also referred to as SISCAP) waveguide that provides efficient, high-speed optical modulation of an optical signal passing through the optical apparatus 100. Specifically, FIG. 1 depicts a cross-section of the SISCAP structure in which the optical signal travels in a direction of an optical path projecting into, or out of, the page. FIG. 1 illustrates the confinement of an optical mode 170 of the optical signal by the insulator layer 102 and the dielectric material 135 (e.g., silicon oxide or silicon nitride) surrounding the upper waveguide 105 and the lower waveguide 110. Moreover, the dimensioning of the upper waveguide 105 and the lower waveguide 110 (e.g., thicknesses and widths) may be selected to provide a desired confinement of the optical mode 170. For example, the intensity of the optical mode 170 may generally increase when approaching a center of the optical mode 170. Through selecting properties of the upper waveguide 105 and the lower waveguide 110, the more intense portions of the optical mode 170 may be shaped or better confined to allow more efficient modulation of the optical signal.

The gate dielectric layer 150 establishes a charge modulation region 155 (also referred to as a charge accumulation region) shown by a dashed box in which free carriers (e.g., electrons and holes) flow into and out of the upper waveguide 105 and the lower waveguide 110 (respectively, P-doped and N-doped). Doing so creates an active region (defined by $W_{active}$) where the switching function associated with the optical apparatus 100 (e.g., at switching speeds of 1 Gb/s or greater, such as 10 Gb/s, 28 Gb/s, 40 Gb/s, 100 Gb/s, 200 Gb/s, 400 Gb/s, etc.) can be controlled by a voltage potential applied across the gate dielectric layer 150. In one embodiment, the voltage potential is used to alter the phase of the optical signal propagating through the optical apparatus 100 as in, for example, a Mach-Zehnder interferometer (MZI). However, the electro-optic modulators described herein may also be used in other types of devices such as ring resonators, Fabry-Perot cavities, etc.

The gate dielectric layer 150 may be referred to as either "gate dielectric" or "gate oxide," where it is to be understood that an oxide is only an exemplary form of a dielectric that may be used in the optical apparatus 100. The gate dielectric layer 150 may comprise any material that allows for fast charging and/or discharging of the free carriers (e.g., a material which enables switching speeds of 1 Gb/s or greater). A non-limiting list of suitable materials for the gate dielectric layer 150 includes hafnium oxide, oxynitride, bismuth oxide, silicon nitride, silicon oxide, and combinations of these materials. Furthermore, using high-K dielectric materials for the gate dielectric layer 150 provide higher capacitance and greater charge densities, when compared with dielectrics materials having lower dielectric constants (assuming a same thickness and voltage potential). For example, hafnium oxide and silicon nitride (high-K dielectrics) have higher dielectric constants than silicon oxide, and thus, enable greater charge densities across the gate dielectric layer 150 relative to using silicon oxide. In some cases, using the higher voltages increases the modulation efficiency—i.e., the amount the optical signal is phase-shifted relative to the amount of voltage applied.

The upper waveguide 105 comprises a central region 145 and lateral regions 165, and the lower waveguide 110 comprises a central region 140 and lateral regions 165. The upper waveguide 105 and the lower waveguide 110 further comprise respective ridges 120, 115 extending from the respective central regions 145, 140. In this way, the lower waveguide 110 and the upper waveguide 105 may also be referred to as ridge waveguides or ribbed waveguides. The ridges 115, 120 extend in the direction of the optical path (here, projecting into or out of the page), and the ridges 115, 120 are at least partly overlapping with each other.

The ridges 115, 120 aid in confining the optical mode 170 laterally (e.g., in the width direction) in the optical apparatus 100. As shown, the ridge 115 of the lower waveguide 110 is surrounded on two sides by the dielectric material 135 which confines the optical mode 170 near the charge modulation region 155 due to the different refractive indexes associated with the dielectric material 135 and the lower waveguide 110. In some embodiments, the ridges 115, 120 are aligned at the charge modulation region 155. In some embodiments, the ridges 115, 120 are centered along a width of the respective lower waveguide 110 and the upper waveguide 105. In other embodiments, one or more of the ridges 115, 120 are not centered.

As shown, a lower surface of the gate dielectric layer 150 contacts an upper surface of a first waveguide (here, an upper surface of the ridge 115 of the lower waveguide 110), and an upper surface of the gate dielectric layer 150 contacts a lower surface of a second waveguide (here, the upper waveguide 105). Although the Figures described herein illustrate the gate dielectric layer 150 between the oppositely-doped upper waveguide 105 and lower waveguide 110, this is not a requirement. In some alternate embodiments, the gate dielectric layer 150 is omitted and the upper waveguide 105 and the lower waveguide 110 directly contact to form a P-N junction. In this example, the P-N junction establishes the charge modulation region 155 where the free carriers flow into and out of the waveguides. However, including the gate dielectric layer 150 may improve the efficiency of the optical modulation.

If the ridge 115 was omitted and the upper surface of the lower waveguide 110 directly contacted the gate dielectric layer 150, the optical mode 170 may spread out laterally within the lower waveguide 110 more than what is illustrated in FIG. 1. As such, more of the light in the optical mode 170 would be outside the charge modulation region 155, thereby reducing the efficiency of the optical apparatus 100. In one embodiment, the thicknesses of the ridges 115, 120 are around 40-60% of the thickness of the bottom portions of the lower waveguide 110 and the upper waveguide 105. Furthermore, the actual thickness values of the ridges 115, 120 may be selected to achieve a desired confinement of the optical mode 170 in the lateral dimension (i.e., the width dimension) relative to the doping levels and distances of the lateral regions 160, 165 from the portion of the lower waveguide 110 and the upper waveguide 105 that overlap with the gate dielectric layer 150.

Furthermore, by including the ridge 120 in the upper waveguide 105, the optical apparatus 100 may have a greater efficiency than an implementation including only the ridge 115. In the SISCAP design shown, the greatest intensity of the optical signal occurs approximately in the middle of the optical mode 170. Without the ridge 120, the center of the optical mode 170 may be positioned below the gate dielectric layer 150. Here, the center of the optical mode 170 is positioned near or proximate to the gate dielectric layer 150. This results in the greatest intensity of the optical signal falling within the charge modulation region 155. Stated differently, although adding the ridge 120 may decrease the vertical confinement of the optical mode 170, the ridge 120 aligns the optical mode 170 such that the greatest intensity of the optical signal is within the charge modulation region 155, thereby improving efficiency of the optical apparatus 100.

A width of the upper waveguide 105 and the lower waveguide 110 may be selected to keep electrical contacts 125 and/or vias 130 disposed away from the optical mode 170. As shown, the width of the lower waveguide 110 is greater than the width of the upper waveguide 105, and the lateral regions 160 of the lower waveguide 110 are arranged laterally outward from the lateral regions 165 of the upper waveguide 105. In some embodiments, the electrical contacts 125 and/or the vias 130 are metallic or formed from silicide. Because electrically conductive materials may have a deleterious effect on optical modulation, the upper waveguide 105 and the lower waveguide 110 may be designed such that any conductive materials are sufficiently outside the boundaries of the optical mode 170.

Moreover, as shown in FIG. 1, the lateral regions 165 of the upper waveguide 105 and the lateral regions 160 of the lower waveguide 110 that are disposed proximate to the electrical contacts 125 are more heavily doped than the central regions 140, 145 of the lower waveguide 110 and the upper waveguide 105, respectively. Because the dopant may have a deleterious effect on the optical signal (e.g., increased optical loss), the dopant concentration in the upper waveguide 105 and the lower waveguide 110 where the optical mode 170 is located may be lightly doped. In some embodiments, the ridges 115, 120 have a doping different than other regions (e.g., portions of the central regions 140, 145 away from the ridges 115, 120) of the upper waveguide 105 and the lower waveguide 110. In some embodiments, the ridges 115, 120 are more lightly doped than the other regions. This arrangement may improve the electrical connection between the upper waveguide 105 and the lower waveguide 110 and the electrical contacts 125, thereby decreasing the electrical resistance and related resistance-capacitance (RC) time constant associated with the optical apparatus 100. Moreover, increasingly doped portions of the upper waveguide 105 and the lower waveguide 110 disposed proximate to the electrical connection to an external voltage source may be applied to any of the embodiments described herein. Furthermore, the concentration of dopant may increase in the upper waveguide 105 and the lower waveguide 110 as the distance from the optical mode 170 increases. The dopant concentration may be increased in a step-wise or a substantially continuous manner as the distance from the optical mode 170 increases. Doing so improves the electrical conductivity of the upper waveguide 105 and the lower waveguide 110 and mitigates the negative effect of the dopant on the optical signal. Furthermore, in one embodiment, the electrical contacts 125 may be omitted and the vias 130 contact the (more heavily-doped) lateral regions 160, 165 directly.

In some embodiments, the width of the active region $W_{active}$ (i.e., corresponding to the width of the gate dielectric layer 150) is less than a micron, and more specifically, less than half a micron. In some embodiments, the thickness of the upper waveguide 105 and the lower waveguide 110 is between 50 and 200 nanometers. In some embodiments, to center the greatest intensity of the light in the optical mode 170 in the charge modulation region 155, the respective thicknesses of the upper waveguide 105 and the lower waveguide 110 are the same. In some embodiments, the thickness of the gate dielectric layer 150 is between 1 and 20 nanometers.

Figure 2:
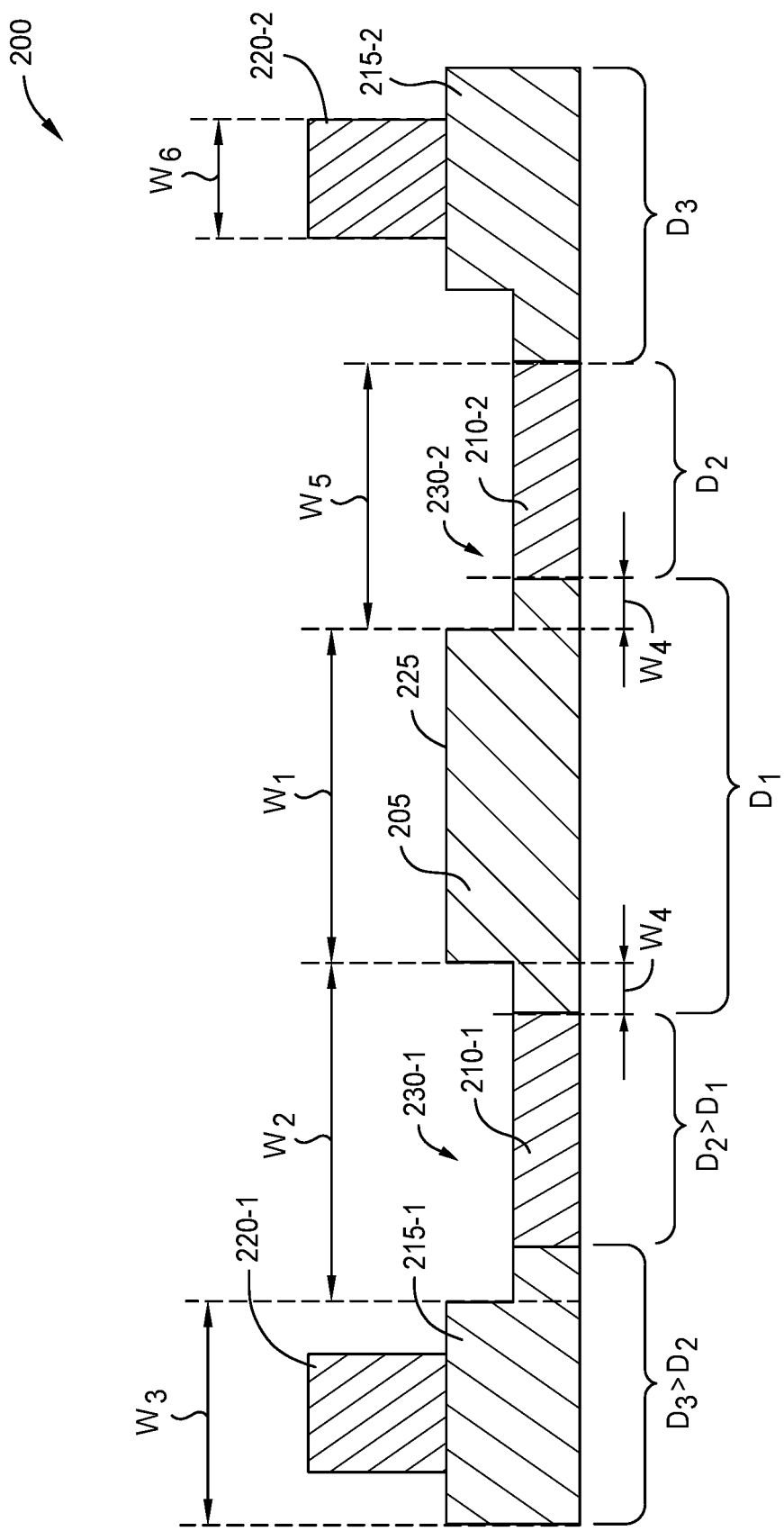
FIG. 2 illustrates exemplary spacing of an optical waveguide, according to one or more embodiments.

FIG. 2 illustrates exemplary spacing of an optical waveguide 200, according to one or more embodiments. The features described in FIG. 2 may be used in conjunction with other embodiments. The optical waveguide 200 may be an example of the upper waveguide 105 and/or the lower waveguide 110 of the optical apparatus 100 of FIG. 1.

The optical waveguide 200 comprises a ridge 205, and raised portions 215-1, 215-2 that are spaced apart from the ridge 205 by elongated portions 210-1, 210-2, respectively. As shown, the ridge 205 has a width $w_1$, each elongated portion 210-1, 210-2 has a width $w_2$, and each raised portion 215-1, 215-2 has a width $w_3$. In some embodiments, each of the widths $w_1$, $w_2$, $w_3$ is within a range between 200 nanometers (nm) and 800 nm. In one non-limiting example, the width $w_1$ is about 450 nm, the width $w_2$ is about 500 nm, and width $w_3$ is about 400 nm.

In some embodiments, the elongated portions 210-1, 210-2 are formed by etching partly through the optical waveguide 200 (e.g., by forming trenches 230-1, 230-2 on opposing sides of the ridge 205). In some embodiments, the ridge 205 extends to a top surface 225 of the optical waveguide, and the trenches 230-1, 230-2 are formed from the top surface 225. In some embodiments, the raised portions 215-1, 215-2 extend to the top surface 225. In other embodiments, one or both of the raised portions 215-1, 215-2 do not extend to the top surface 225.

As discussed above, different regions of the optical waveguide 200 may have different doping levels, e.g., to provide a predefined resistance across the optical waveguide 200 and/or a predefined optical loss along the optical path. As shown, the ridge 205 has a first doping level (or concentration) D1, and the raised portions 215-1, 215-2 have a third doping level D3 that is greater than the first doping level D1. The elongated portions 210-1, 210-2 each have sub-portions of the first doping level D1, the third doping level D3, and a second doping level D2 (e.g., D3>D2>D1).

In some embodiments, the sub-portions of the elongated portions 210-1, 210-2 having the first doping level D1 are arranged adjacent to the ridge 205, such that a width margin is provided around the ridge 205. The width margin may be selected to provide a predefined optical loss along the optical path, which may be used to shape an optical mode along the optical path. As shown, the width margin is provided as widths $w_4$ on opposing sides of the ridge 205. In one non-limiting example, the width $w_4$ is about 50 nm. However, other implementations may have the width margin defined on only one side of the ridge 205, may have different widths, and so forth.

In some embodiments, the doping of the different regions of the optical waveguide 200 occurs in distinct doping steps or stages. For example, the entire optical waveguide 200 may be doped to the first doping level D1 in a first doping step. In some embodiments, a spacer layer is conformally deposited or otherwise applied above the optical waveguide 200, such that spacers of a predetermined width are formed on sidewalls of each trench 230-1, 230-2. As used herein, "conformally depositing" indicates that material of the spacer layer conforms to the contours of the optical waveguide 200. In some embodiments, each of the spacers has the width $w_4$, e.g., where the spacer layer has a uniform thickness. In other embodiments, one or more of the spacers has a different width. The spacer layer may be etched through to expose a bottom of each trench 230-1, 230-2. The regions of the optical waveguide 200 that are laterally outward from the spacers adjacent to the ridge 205 may then be doped to the second doping level D2 in a second doping step, which may include implanting ions at the exposed bottom of each trench 230-1, 230-2.

Beneficially, the spacer width may be well-controlled, e.g., through controlling a deposition thickness of the spacer layer. Errors due to critical dimension variation and/or overlay errors from lithography may be mitigated, which allows the resistance across the optical waveguide 200 and/or the optical loss along the optical path to be more precisely controlled.

A masking layer may be applied over the optical waveguide 200, such that the laterally outward regions (e.g., sub-portions of the elongated portions 210-1, 210-2 and the raised portions 215-1, 215-2) of the optical waveguide 200 are exposed. As shown, the laterally outward regions are laterally outward from a width $w_5$ from the ridge 205. In one non-limiting example, the width $w_5$ is about 400 nm. The laterally outward regions may then be doped to the third doping level D3 in a third doping step.

Electrical contacts 220-1, 220-2 contact respective ones of the raised portions 215-1, 215-2. The electrical contacts 220-1, 220-2 may represent examples of the electrical contacts 125 of FIG. 1. The electrical contacts 220-1, 220-2 have a width $w_6$, which in one non-limiting example is about 400 nm. In some embodiments, the electrical contacts 220-1, 220-2 are metallic or formed from silicide.

Figure 3:
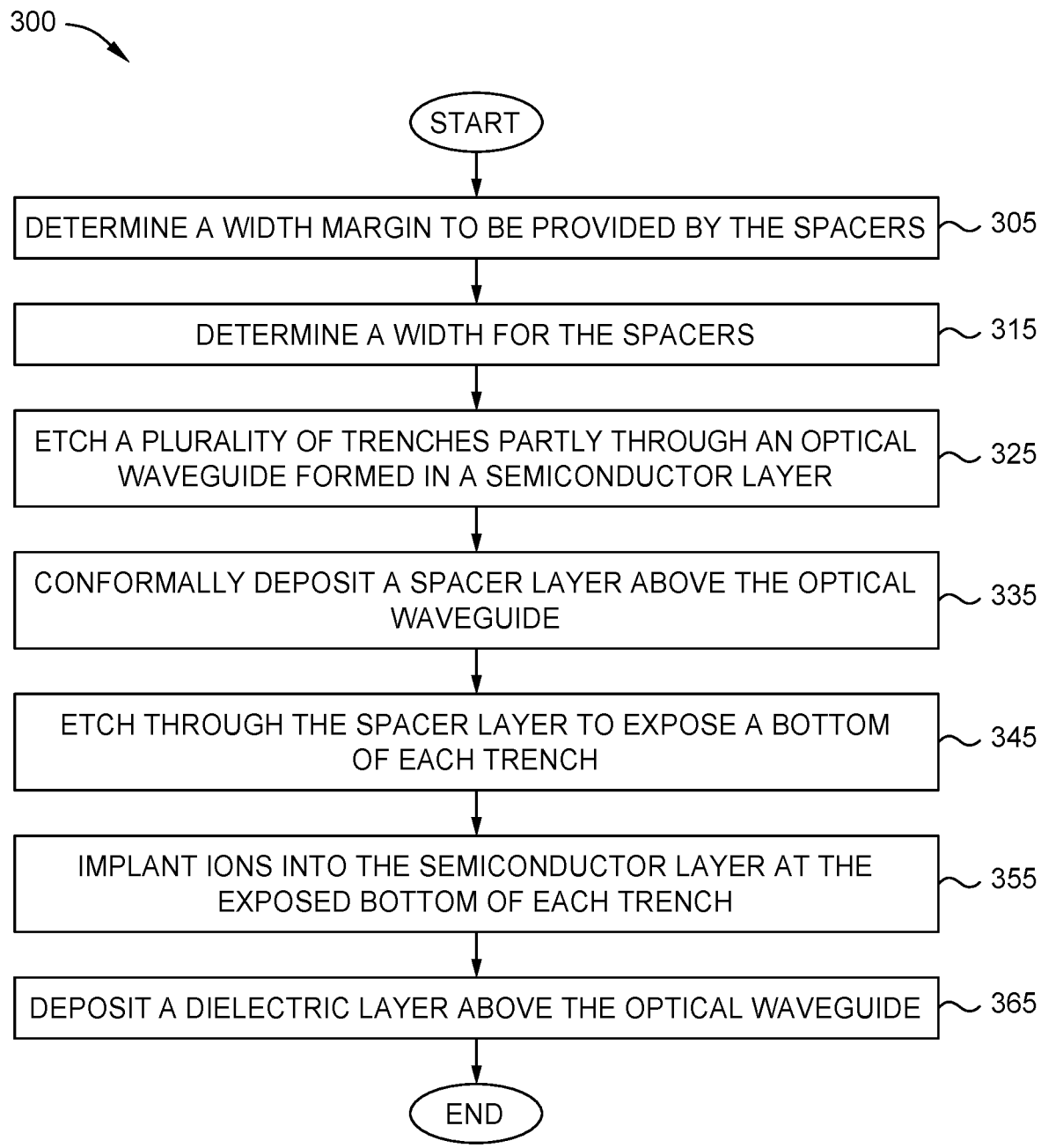
FIG. 3 is an exemplary method of fabricating an optical apparatus, according to one or more embodiments.

FIG. 3 is an exemplary method 300 of fabricating an optical apparatus, according to one or more embodiments. The method 300 may be used in conjunction with other embodiments, e.g., to form the optical waveguide 200 of FIG. 2.

The method 300 begins at block 305, where a width margin to be provided by the spacers around a ridge of the optical waveguide is determined. In some embodiments, the ridge extends in a direction of an optical path, and the width margin is determined to provide a predefined optical loss along the optical path. At block 315, a predetermined width for the spacers is determined to provide the width margin.

At block 325, a plurality of trenches is etched partly through the optical waveguide. Etching the plurality of trenches forms a ridge in the optical waveguide between adjacent trenches of the plurality of trenches. At block 335, a spacer layer is conformally deposited above the optical waveguide. Conformally depositing the spacer layer forms spacers on sidewalls of each trench. In some embodiments, the spacers have a predetermined width.

At block 345, the spacer layer is etched through to expose a respective bottom of each trench. A width of each bottom is defined by the spacers formed on the sidewalls of the respective trench. At block 355, ions are implanted into the semiconductor layer at the exposed bottom of each trench. In some embodiments, a doping of the ridge differs from that of the semiconductor layer at the respective bottom of each trench.

At block 365, a dielectric layer is deposited above the optical waveguide. In some embodiments, deposited dielectric material extends to the respective bottom of each trench. The method 300 ends following completion of block 365.

Figure 4:
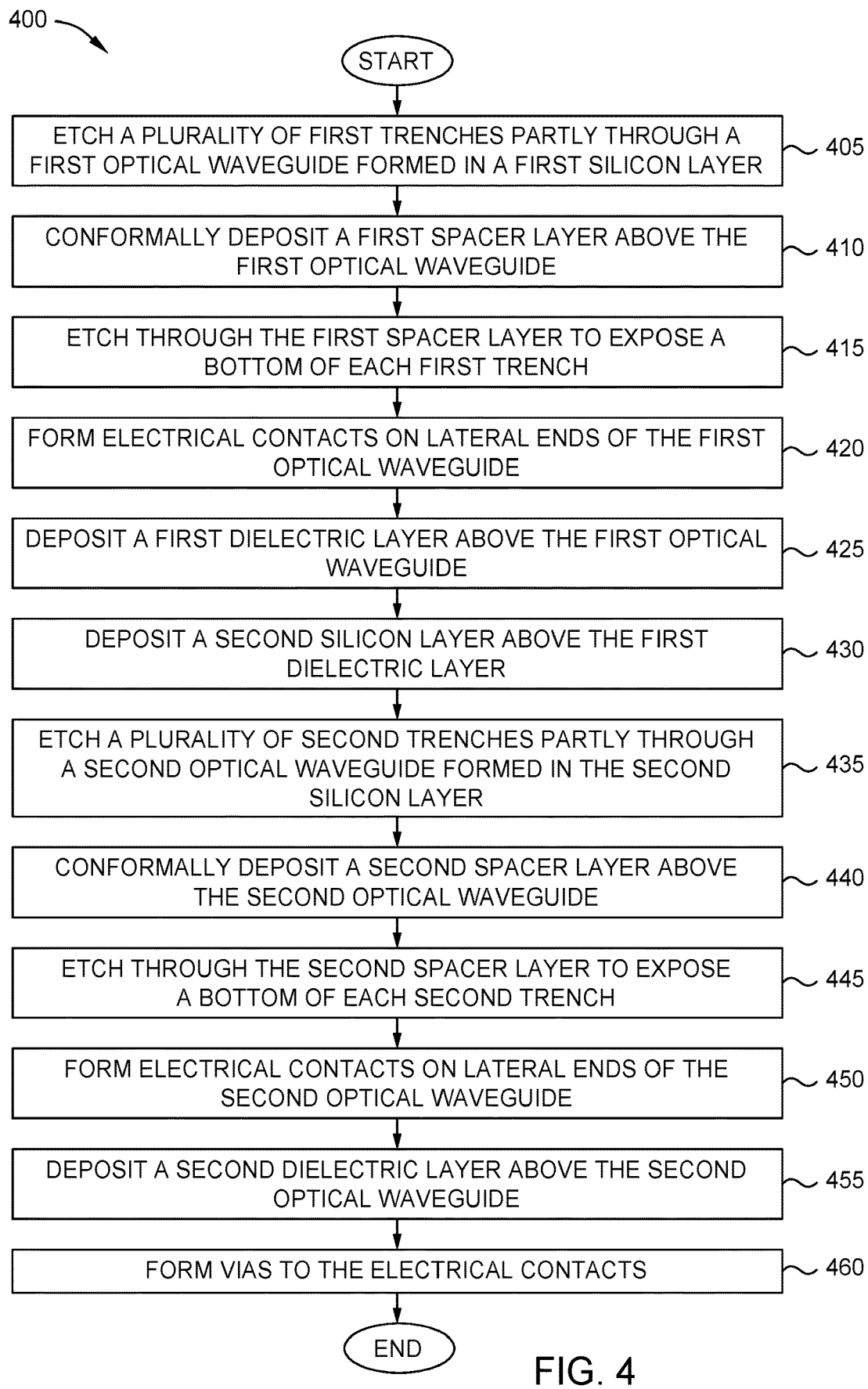
FIG. 4 is an exemplary method of fabricating a silicon-insulator-silicon capacitive (SISCAP) apparatus, according to one or more embodiments.

FIG. 4 is an exemplary method 400 of fabricating a silicon-insulator-silicon capacitive (SISCAP) apparatus, according to one or more embodiments. The method 400 may be used in conjunction with other embodiments, e.g., to form the optical waveguide 200 of FIG. 2.

The method 400 begins at block 405, where a plurality of first trenches is etched partly through a first optical waveguide formed in a first silicon layer. In some embodiments, the first silicon layer is a silicon layer of a SOI substrate.

Figure 5A:
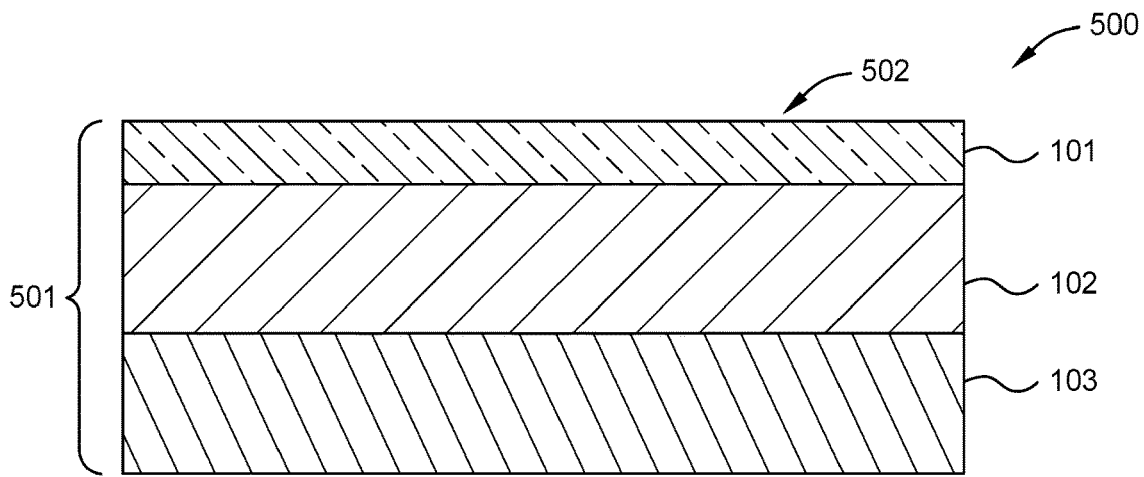
FIGS. 5A-5I illustrate an exemplary sequence of fabricating an optical apparatus using a silicon-on-insulator (SOI) substrate, according to one or more embodiments.

Diagram 500 of FIG. 5A depicts a SOI substrate 501 comprising a semiconductor substrate 103 (here, a silicon substrate), an insulator layer 102 (here, a buried oxide (BOX) layer) arranged above the semiconductor substrate 103, and a semiconductor layer 101 (here, a silicon layer) arranged above the insulator layer 102. The semiconductor layer 101 defines a top surface 502 of the SOI substrate 501.

Figure 5B:
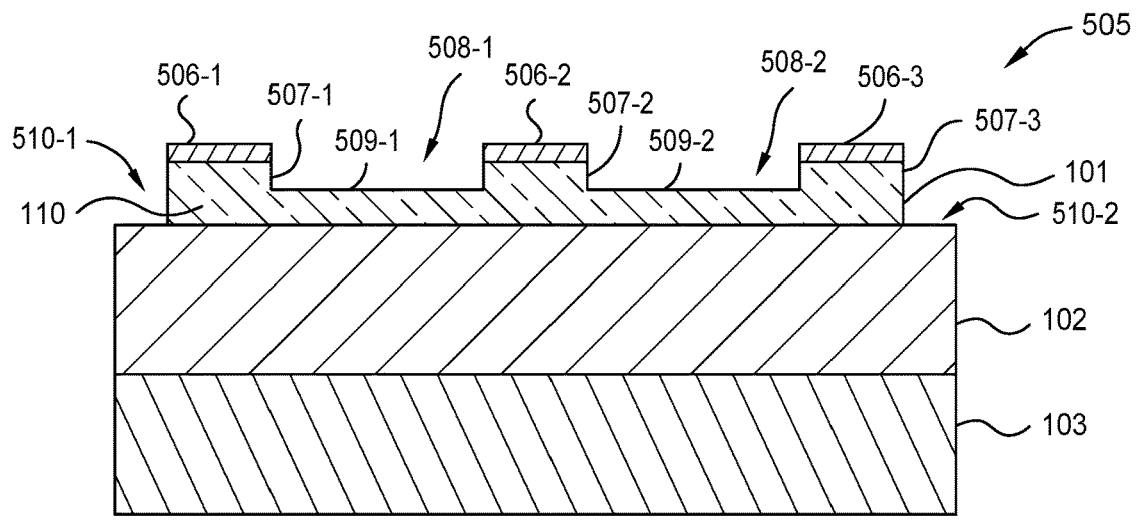

In diagram 505 of FIG. 5B, a hard mask layer is applied above the semiconductor layer 101. The hard mask layer may be formed of any suitable material(s), such as silicon nitride. The hard mask layer includes features 506-1, 506-2, 506-3. An etching process is performed, forming trenches 508-1, 508-2 partly through the semiconductor layer 101. As shown, the trenches 508-1, 508-2 extend from the top surface 502 to a respective bottom 509-1, 509-2. Forming the trenches 508-1, 508-2 defines a raised portion 507-1 beneath the feature 506-1, a raised portion 507-2 beneath the feature 506-2, and a raised portion 507-3 beneath the feature 506-3. The raised portions 507-1, 507-3 may be examples of the raised portions 215-1, 215-2, and the raised portion 507-2 may be an example of the ridge 205, that are depicted in FIG. 2. In some embodiments, an etching process is performed through the semiconductor layer 101 to expose the top surface 510-1, 510-2 of the insulator layer 102.

Figure 5C:
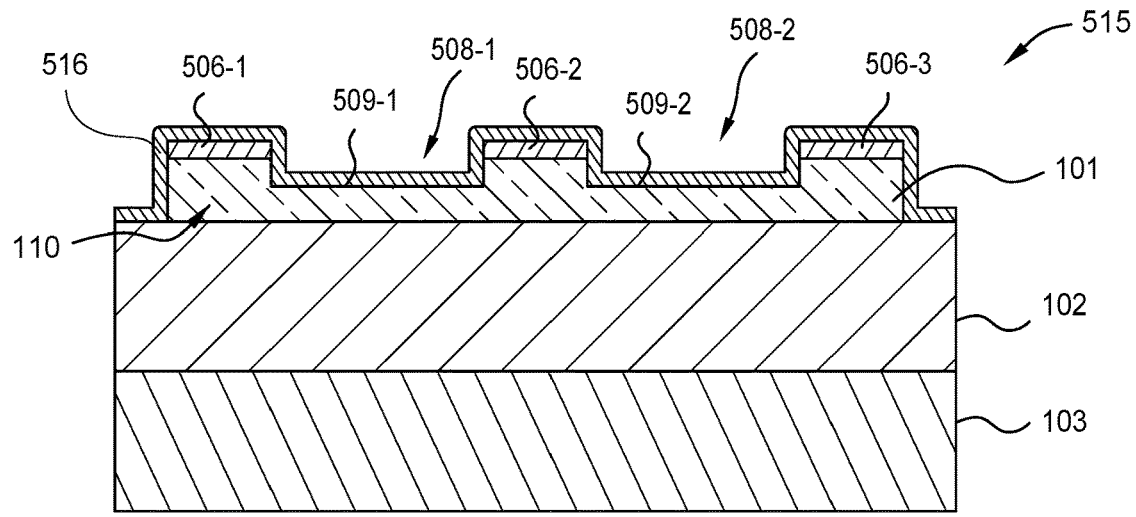

At block 410, a first spacer layer is conformally deposited above the first optical waveguide. The first spacer layer may be formed of any suitable material(s), such as silicon nitride. The conformal deposition may be performed using any suitable process, such as atomic layer deposition (ALD) or other chemical deposition techniques. Diagram 515 of FIG. 5C depicts the lower waveguide 110, and a spacer layer 516 arranged above the features 506-1, 506-2, 506-3 and the bottoms 509-1, 509-2 of the respective trenches 508-1, 508-2. The spacer layer 516 has a substantially uniform thickness.

Figure 5D:
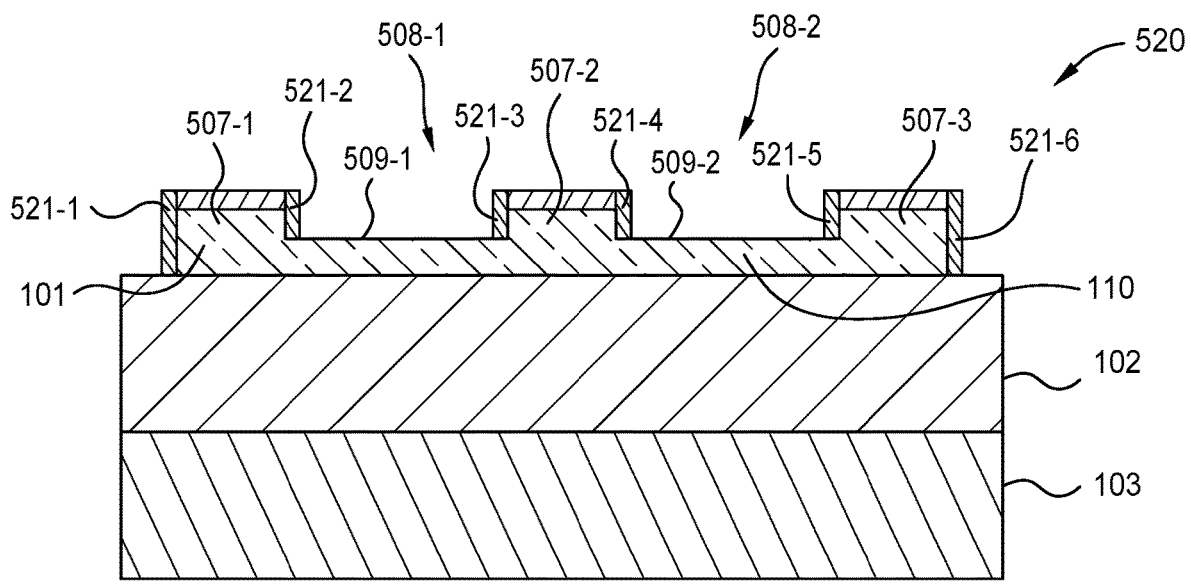

At block 415, the first spacer layer is etched through to expose a bottom of each first trench. In one example, a silicon nitride-selective etching process may be performed. In another example, a time-controlled etching process may be performed without forming more than, e.g., a 5 nm recess into the silicon layer. In some embodiments, etching through the first spacer layer forms spacers of a predetermined width on sidewalls of each first trench. Diagram 520 of FIG. 5D depicts spacers 521-1, 521-2 on opposing sides of the raised portion 507-1, spacers 521-3, 521-4 on opposing sides of the raised portion 507-2, and spacers 521-5, 521-6 on opposing sides of the raised portion 507-3. Stated another way, the spacers 521-2, 521-3 are formed on sidewalls of the trench 508-1, and the spacers 521-4, 521-5 are formed on sidewalls of the trench 508-2. In some embodiments, ions are implanted into the semiconductor layer 101 at the exposed bottom 509-1, 509-2 of each trench 508-1, 508-2.

Beneficially, the width of the spacers 521-1, 521-2, ..., 521-6 may be well-controlled by the deposition thickness of the spacer layer 516. Further, because the spacers 521-1, 521-2, ..., 521-6 are self-aligned to the sidewalls of the trenches 508-1, 508-2, errors due to critical dimension variation and/or overlay errors may be mitigated. As a result, the doping near the raised portions 507-1, 507-2, 507-3 may be more precisely controlled to provide a predetermined resistance and/or an optical loss of an optical waveguide formed using at least the lower waveguide 110.

In some embodiments, the spacers 521-2, 521-3, 521-4, 521-5 remain on the sidewalls of the trenches 508-1, 508-2 during subsequent steps of fabricating the SISCAP apparatus. In this way, the spacers 521-2, 521-3, 521-4, 521-5 help prevent oxidization of the silicon of the raised portions 507-1, 507-2, 507-3 during the subsequent steps.

At block 420, electrical contacts are formed on lateral ends of the first optical waveguide. For example, the features 506-1, 506-2, 506-3 may be removed using a silicon nitride-selective etching process, and the electrical contacts are formed using metal or silicide deposited (not shown) above the raised portions 507-1, 507-3.

Figure 5E:
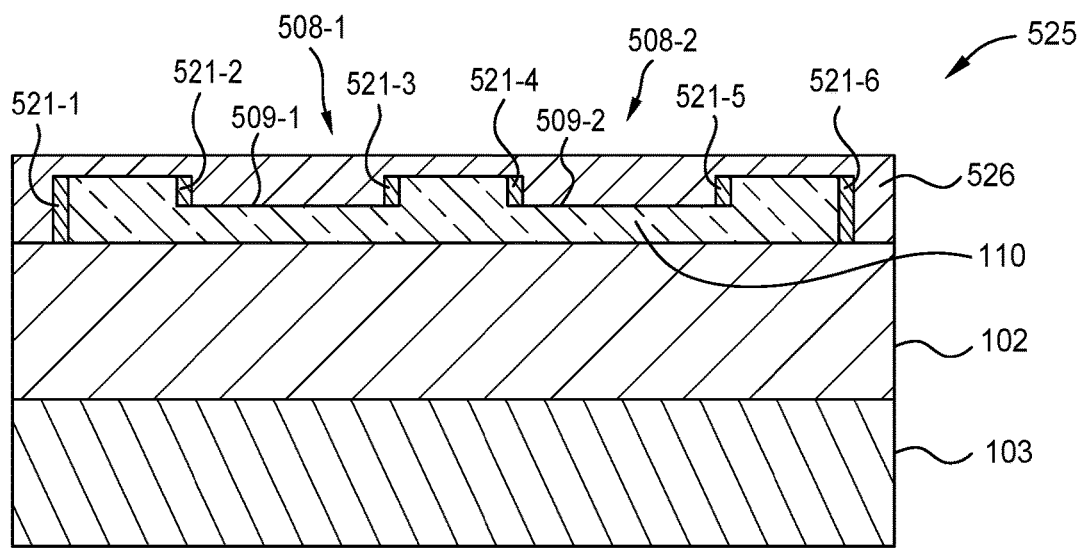

At block 425, a first dielectric layer is deposited above the first optical waveguide. The first dielectric layer may be formed of any suitable material(s), such as silicon oxide, and deposited using any suitable techniques. In diagram 525 of FIG. 5E, the dielectric layer 526 is deposited above the lower waveguide 110, and dielectric material extends to the exposed bottom 509-1, 509-2 of each trench 508-1, 508-2.

Figure 5F:
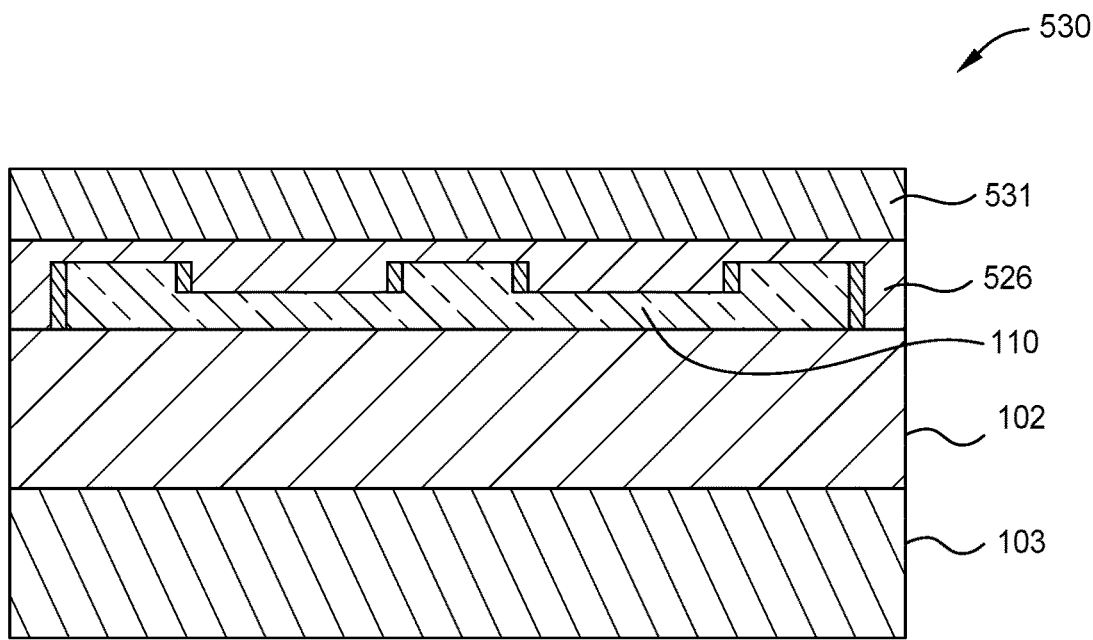

At block 430, a second silicon layer is deposited above the first dielectric layer. The second silicon layer may be deposited using any suitable techniques. In some embodiments, the second silicon layer comprises polycrystalline silicon. In diagram 530 of FIG. 5F, a silicon layer 531 is deposited above the dielectric layer 526.

At block 435, a plurality of second trenches is etched partly through a second optical waveguide formed in the second silicon layer. At block 440, a second spacer layer is conformally deposited above the second optical waveguide. In some embodiments, the same etching process and conformal deposition process are used in blocks 435, 440 as in blocks 405, 410 discussed above.

Figure 5G:
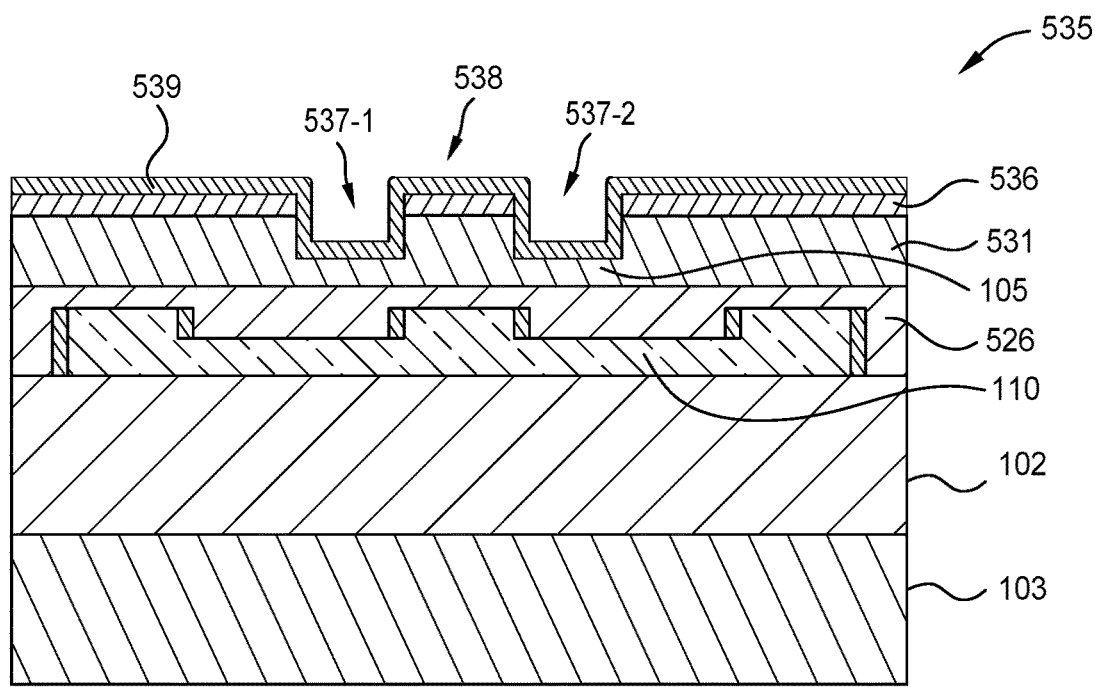

In diagram 535 of FIG. 5G, a hard mask layer 536 is arranged above the silicon layer 531, and an etching process forms trenches 537-1, 537-2 into the upper waveguide 105. Forming the trenches 537-1, 537-2 also operates to form a ridge 538 in the upper waveguide 105. A spacer layer 539 is arranged above the hard mask layer 536 and the bottoms of the trenches 537-1, 537-2. The spacer layer 539 has a substantially uniform thickness.

At block 445, the second spacer layer is etched through to expose a bottom of each second trench. In some embodiments, etching through the second spacer layer forms spacers of a predetermined width on sidewalls of each second trench. In some embodiments, the width of the bottom of each second trench is different than the width of the bottom of each first trench. In other embodiments, the widths may be the same.

At block 450, electrical contacts are formed on lateral ends of the second optical waveguide. In some embodiments, the same etching process and process for forming the electrical contacts are used in blocks 445, 450 as in blocks 415, 420 discussed above. In some embodiments, blocks 420 and 450 are performed by a same process (e.g., the electrical contacts are formed on the first optical waveguide and the second optical waveguide at substantially the same time). At block 455, a second dielectric layer is deposited above the second optical waveguide. In some embodiments, the same deposition process and process for forming the electrical contacts are used in blocks 445, 450 as in blocks 415, 420 discussed above.

Figure 5H:
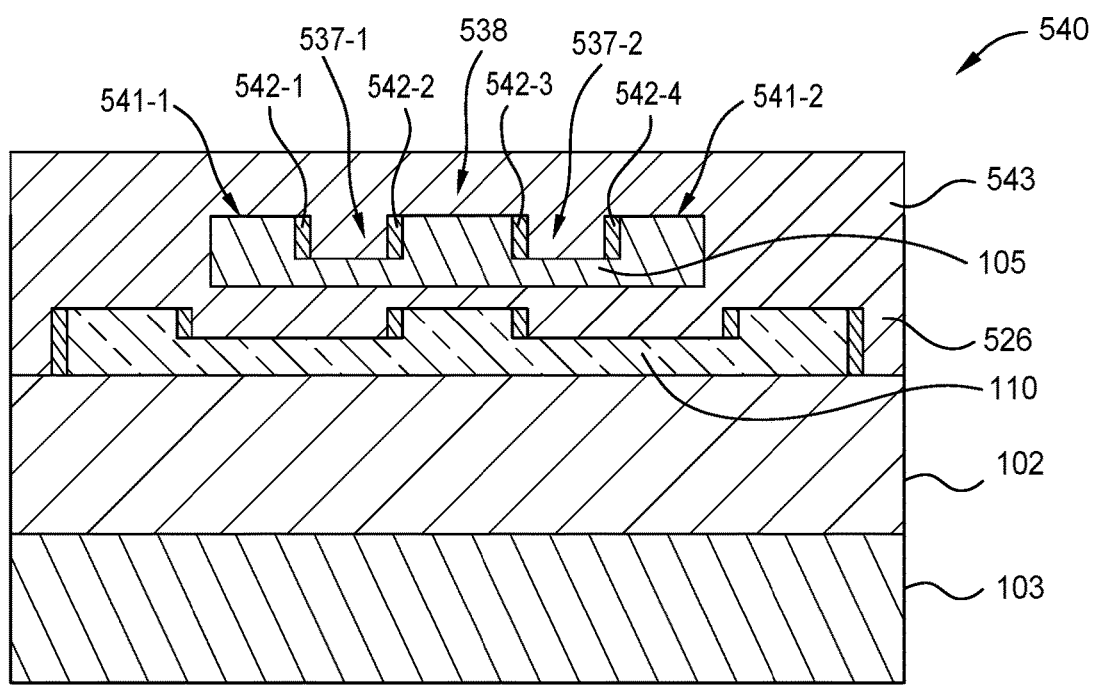

In diagram 540 of FIG. 5H, a spacer 542-1 is adjacent to a raised portion 541-1 of the upper waveguide 105, spacers 542-2, 542-3 are adjacent to the ridge 538, and a spacer 542-4 is adjacent to a raised portion 541-2. Stated another way, the spacers 542-1, 542-2 are formed on sidewalls of the trench 537-1, and the spacers 542-3, 542-4 are formed on sidewalls of the trench 537-2. In some embodiments, ions are implanted into the upper waveguide 105 at the exposed bottom of each trench 537-1, 537-2. Electrical contacts may be formed above the raised portions 541-1, 541-2 using, e.g., metal or silicide. A dielectric layer 543 is arranged above the upper waveguide 105 and above the dielectric layer 526. Dielectric material extends to the exposed bottom of each trench 537-1, 537-2.

Figure 5I:
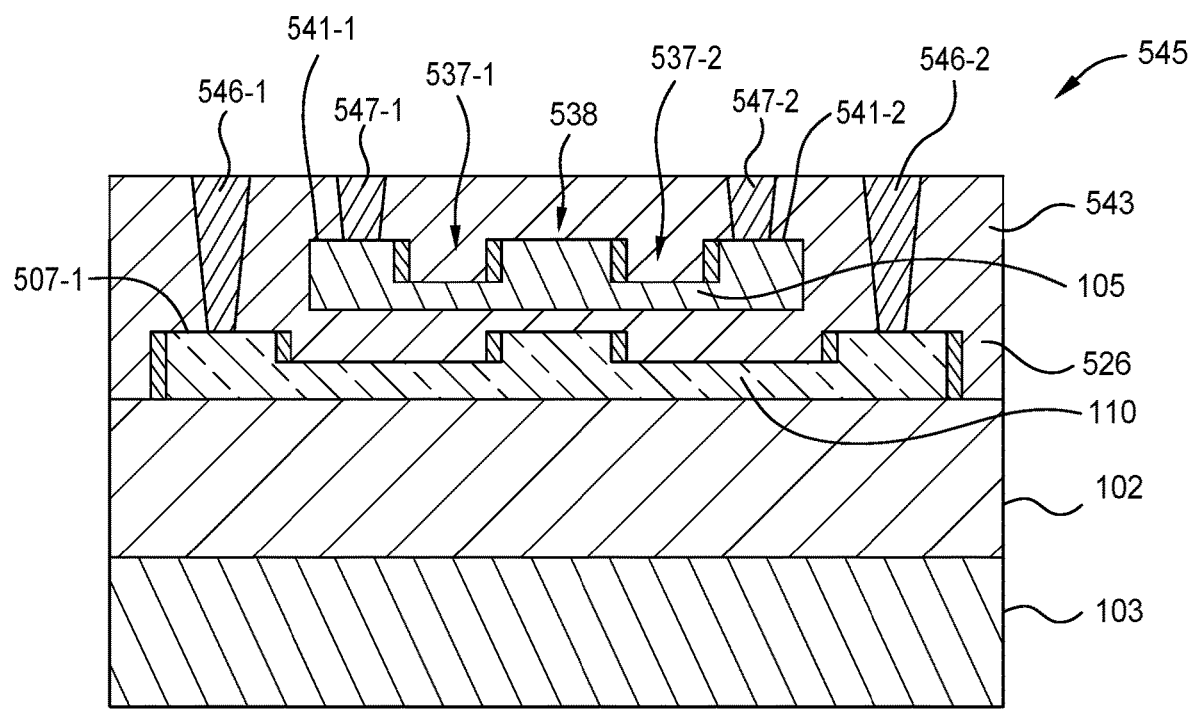

At block 460, vias are formed that extend to the electrical contacts of the first optical waveguide and the second optical waveguide. The vias may be formed using any suitable material(s) and using any suitable techniques. In diagram 545 of FIG. 5I, vias 546-1, 546-2 extend through the dielectric layer 543 and partly through the dielectric layer 526 to respective raised portions 507-1, 507-2 of the lower waveguide 110 (which may include electrical contacts formed thereon), and vias 547-1, 547-2 extend partly through the dielectric layer 543 to respective raised portions 541-1, 541-2 of the upper waveguide 105 (which may include electrical contacts formed thereon). The vias 546-1, 546-2, 547-1, 547-2 may be examples of the vias 130 depicted in FIG. 1. The method 400 ends following completion of the block 460.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method of fabricating an optical apparatus, the method comprising:
   doping a first semiconductor layer to increase a doping level of the first semiconductor layer to a first doping level;
   after doping the first semiconductor layer to the first doping level, applying a hard mask layer above the first semiconductor layer, wherein the hard mask layer includes a plurality of features;
   after applying the hard mask layer, etching a first trench and a second trench partly through the first semiconductor layer to form a first optical waveguide that includes (i) a first ridge beneath a first feature of the plurality of features and between the first trench and the second trench, (ii) a second ridge beneath a second feature of the plurality of features, and (iii) a third ridge beneath a third feature of the plurality of features, wherein the first trench is between the first ridge and the second ridge, wherein the second trench is between the first ridge and the third ridge, wherein a first bottom of the first trench is exposed, and wherein a second bottom of the second trench is exposed;
   after etching the first trench and the second trench, conformally depositing a spacer layer on the plurality of features, the first trench, and the second trench such that spacers are formed on sidewalls of the first trench and the second trench;
   after depositing the spacer layer, etching through the spacer layer to expose the first bottom and the second bottom, wherein a width of an exposed portion of the first bottom is defined by the spacers formed on the sidewalls of the first trench, and a width of an exposed portion of the second bottom is defined by the spacers formed on the sidewalls of the second trench;
   after etching the spacer layer, doping the exposed portion of the first bottom and the exposed portion of the second bottom to a second doping level greater than the first doping level while the first feature keeps the first ridge at the first doping level; and
   depositing a first dielectric layer above the first optical waveguide such that the first dielectric layer extends to the first bottom and the second bottom.

2. The method of claim 1, further comprising:
   determining a width margin to be provided by the spacers around the first ridge; and
   determining a predetermined width for the spacers to provide the width margin.

3. The method of claim 2,
   wherein the first ridge extends in a direction of an optical path, and
   wherein the width margin is determined to provide a predetermined resistance across the first optical waveguide and a predetermined optical loss along the optical path.

4. The method of claim 1, further comprising:
   forming a second optical waveguide in a second semiconductor layer;
   depositing a second dielectric layer above the second optical waveguide; and
   depositing the first semiconductor layer above the second dielectric layer,
   wherein the first ridge overlaps a portion of the second optical waveguide.

5. The method of claim 4,
   wherein the first ridge extends in a direction of an optical path, and
   wherein the first ridge overlaps a second ridge that is formed in the second optical waveguide and that extends in the direction.

6. The method of claim 1, wherein the first semiconductor layer comprises a silicon layer of a silicon-on-insulator (SOI) substrate.

7. The method of claim 1, wherein the spacer layer comprises a silicon nitride layer.

8. The method of claim 1, wherein the spacer layer has a substantially uniform thickness that provides the spacers with a predetermined width.

9. A method of fabricating a silicon-insulator-silicon capacitive (SISCAP) apparatus, the method comprising:
   doping a first silicon layer to increase a doping level of the first silicon layer to a first doping level;
   after doping the first silicon layer to the first doping level, applying a first hard mask layer above the first silicon layer, wherein the first hard mask layer includes a plurality of first features;
   after applying the first hard mask layer, etching a first trench and a second trench partly through the first silicon layer to form a first optical waveguide that includes (i) a first ridge beneath a first feature of the plurality of first features and between the first trench and the second trench, (ii) a second ridge beneath a second feature of the plurality of first features, and (iii) a third ridge beneath a third feature of the plurality of first features, wherein the first trench is between the first ridge and the second ridge, wherein the second trench is between the first ridge and the third ridge, wherein a first bottom of the first trench is exposed, and wherein a second bottom of the second trench is exposed;
   after etching the first trench and the second trench, conformally depositing a first spacer layer on the plurality of first features, the first trench, and the second trench such that spacers are formed on sidewalls of the first trench and the second trench;

after depositing the first spacer layer, etching through the first spacer layer to expose the first bottom and the second bottom, wherein a width of an exposed portion of the first bottom is defined by the spacers formed on the sidewalls of the first trench, and a width of an exposed portion of the second bottom is defined by the spacers formed on the sidewalls of the second trench;

after etching the first spacer layer, doping the exposed portion of the first bottom and the exposed portion of the second bottom to a second doping level greater than the first doping level while the first feature keeps the first ridge at the first doping level;

depositing a first dielectric layer above the first optical waveguide such that the first dielectric layer extends to the first bottom and the second bottom;

depositing a second silicon layer above the first dielectric layer;

applying a second hard mask layer above the second silicon layer, wherein the second hard mask layer includes a plurality of second features;

etching a plurality of second trenches partly through the second silicon layer to form a second optical waveguide, wherein a fourth ridge is formed in the second optical waveguide beneath one feature of the plurality of second features and between adjacent second trenches;

conformally depositing a second spacer layer above the plurality of second features and the plurality of second trenches, wherein spacers are formed on sidewalls of each second trench;

etching through the second spacer layer to expose a respective bottom of each second trench, wherein, for each respective bottom of each second trench, a width of the respective bottom is defined by the spacers formed on the sidewalls of the second trench corresponding to the respective bottom; and depositing a second dielectric layer above the second optical waveguide, wherein dielectric material extends to the respective bottom of each second trench.

10. The method of claim 9,
wherein the first silicon layer comprises a monocrystalline silicon layer,
wherein the first dielectric layer comprises an silicon oxide layer, and
wherein the second silicon layer comprises a polycrystalline silicon layer.

11. The method of claim 10,
wherein the monocrystalline silicon layer is a top layer of a silicon-on-insulator (SOI) substrate.

12. The method of claim 9,
wherein the first ridge and the fourth ridge each extend in a direction of an optical path, and
wherein a predetermined width of the spacers of the first spacer layer and of the second spacer layer provides a predetermined resistance across the first optical waveguide and the second optical waveguide, respectively, and a predetermined optical loss along the optical path.

13. The method of claim 12,
wherein the first ridge has a doping different than regions of the first optical waveguide that are laterally outward from the first ridge, and
wherein the fourth ridge has a doping different than other regions of the second optical waveguide that are laterally outward from the fourth ridge.

\* \* \* \* \*